United States Patent
Beale et al.

(10) Patent No.: US 12,047,893 B2
(45) Date of Patent: Jul. 23, 2024

(54) TIMING ADVANCE VALIDATION

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 411 days.

(21) Appl. No.: 17/427,658

(22) PCT Filed: Jan. 9, 2020

(86) PCT No.: PCT/EP2020/050444
§ 371 (c)(1),
(2) Date: Aug. 2, 2021

(87) PCT Pub. No.: WO2020/164817
PCT Pub. Date: Aug. 20, 2020

(65) Prior Publication Data
US 2022/0124658 A1   Apr. 21, 2022

(30) Foreign Application Priority Data
Feb. 12, 2019   (EP) .................................... 19156775

(51) Int. Cl.
H04W 56/00     (2009.01)
H04B 17/318    (2015.01)
H04W 24/10     (2009.01)

(52) U.S. Cl.
CPC ...... *H04W 56/0045* (2013.01); *H04B 17/318* (2015.01); *H04W 24/10* (2013.01); *H04W 56/001* (2013.01); *H04W 56/006* (2013.01)

(58) Field of Classification Search
CPC ........... H04W 56/001; H04W 56/0045; H04W 56/006; H04W 24/10; H04B 17/318
See application file for complete search history.

(56) References Cited

U.S. PATENT DOCUMENTS

2012/0157105 A1* 6/2012 Grob-Lipski ......... H04W 36/32
                                                                 455/437
2021/0297976 A1* 9/2021 Medina Acosta ... H04W 56/003
(Continued)

OTHER PUBLICATIONS

Huawei, HiSilicon; "Feature lead summary of Support for transmission in preconfigured UL resources"; Agenda Item: 6.2.2.2 3GPP TSG RAN WG1 Meeting #95 Spokane, USA, Nov. 12-16, 2018 R1-1813717 (Year: 2018).*
(Continued)

*Primary Examiner* — Gary Mui
(74) *Attorney, Agent, or Firm* — XSENSUS LLP

(57) ABSTRACT

There is described a terminal device for use in a wireless telecommunication system, wherein the terminal device comprises controller circuitry and transceiver circuitry configured to operate together such that the terminal device is operable to: determine a current timing advance for transmitting data to another entity in the wireless telecommunication system; determine an indication of a distance between the terminal device and the other entity; determine a timing advance validity threshold based on the indication of the distance between the terminal device and the other entity; determine an indication of a change in the distance between the terminal device and the other entity; and determine whether or not the current timing advance should be updated based on a comparison between the indication of the change in the distance between the terminal device and the other entity and the timing advance validity threshold.

19 Claims, 5 Drawing Sheets

(56) References Cited

U.S. PATENT DOCUMENTS

| | | | |
|---|---|---|---|
| 2021/0306968 A1* | 9/2021 | Liberg | H04B 17/318 |
| 2022/0022265 A1* | 1/2022 | Selvaganapathy | H04L 1/1896 |
| 2022/0124659 A1* | 4/2022 | Liberg | H04W 56/0045 |

OTHER PUBLICATIONS

RAN WG1; "LS on preconfigured uplink resources in NB-IoT and MTC"; 3GPP TSG RAN WG1#95 Spokane, USA, Nov. 12-16, 2018 R1-1813778 (Year: 2018).*

Sony, "Considerations on Pre-Configured Uplink Resource", 3GPP TSG RAN WG1 Meeting #95, R1-1812754, Nov. 12-16, 2018, 6 pages.

Huawei et al., "UL Transmission in Preconfigured Resource", 3GPP TSG RAN WG1 Meeting #95, R1-1812142, Nov. 12-16, 2018, 8 pages.

Ericsson, "Support for Transmission in Preconfigured UL Resources in NB-Iot", 3GPP TSG-RAN WG1 Meeting #95, R1-1812128, Nov. 12-15, 2018, 13 pages.

Sony, "Considerations for Preconfigured UL Resources in A-MTC", 3GPP TSG RAN WG1 Meeting #94bis, R1-1810649, Oct. 8-12, 2018, 5 pages.

Sierra Wireless, "NB-IoT Pre-configured UL Resources Design Considerations", 3GPP TSG RAN WG1 Meeting #95, R1-1812726, Nov. 12-16, 2018, 11 pages.

Holma et al., "LTE for UMTS OFDMA and SC-FDMA Based Radio Access", John Wiley and Sons, 2009, pp. 25-27.

International Search Report and Written Opinion mailed on Jan. 9, 2020, received for PCT Application PCT/EP2020/050444, Filed on Mar. 6, 2020, 12 pages.

* cited by examiner

TIMING ADVANCE VALIDATION

CROSS-REFERENCE TO RELATED APPLICATIONS

The present application is based on PCT filing PCT/EP2020/050444, filed Jan. 9, 2020, which claims priority to EP 19156775.9, filed Feb. 12, 2019, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to efficiently support communications with an ever-increasing range of devices and data traffic profiles than existing systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles and requirements.

One approach currently considered to be of interest is the support of uplink transmissions on pre-configured uplink resources (PUR), that is to say, the support of data transmission by a terminal device using radio resources which are not specifically allocated to the terminal device for a particular transmission. It is expected this approach will help reduce the amount of signalling overhead associated with certain uplink transmissions.

The inventors have recognized the desire to support transmissions on pre-configured uplink resources gives rise to new challenges that need to be addressed to help optimise the operation of wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
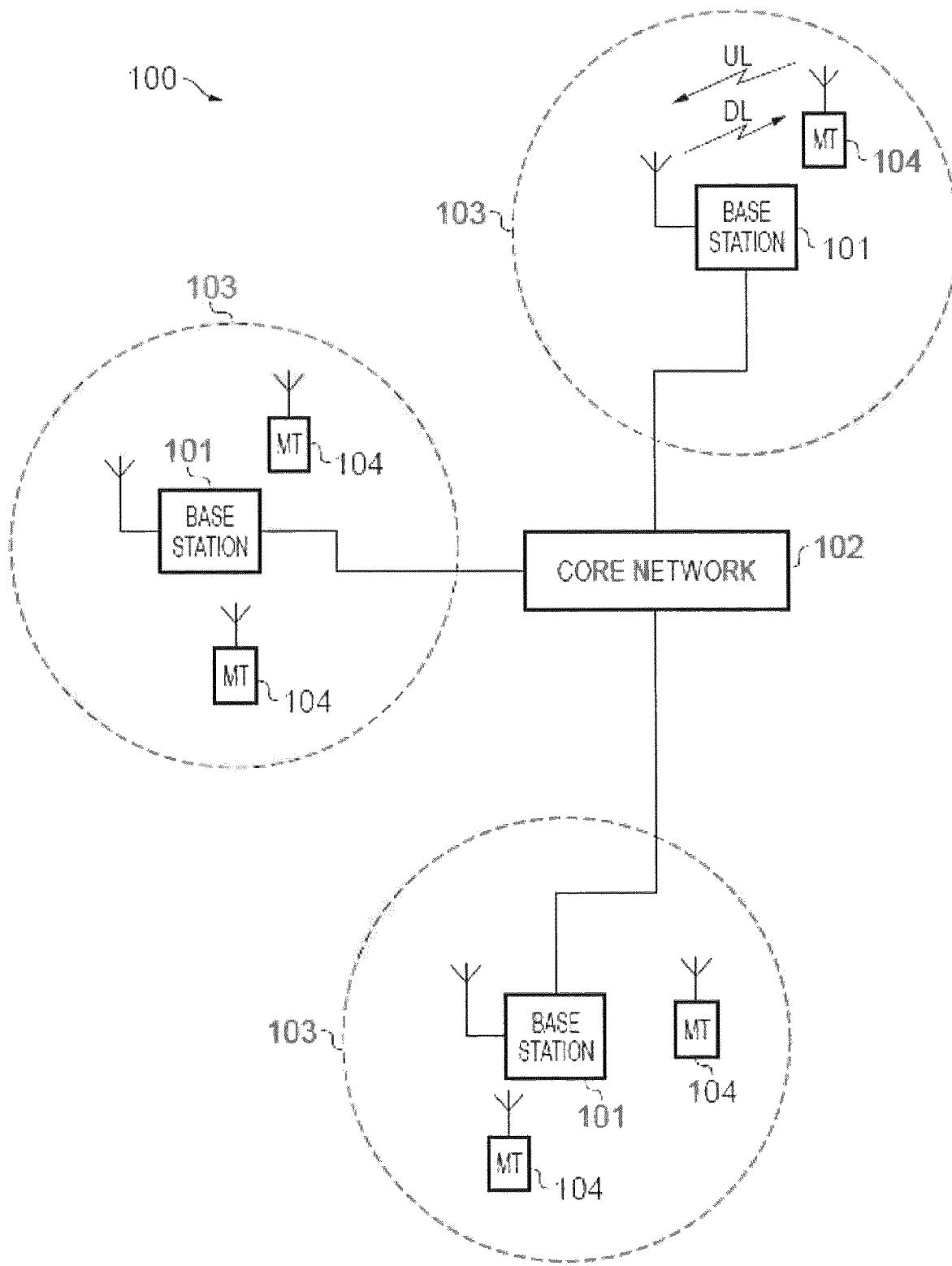
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body and associated proposals, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 within which data can be communicated to and from terminal devices 104. Data is transmitted from base stations 101 to terminal devices 104 within their respective coverage areas 103 via a radio downlink. The coverage area may be referred to as a cell. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
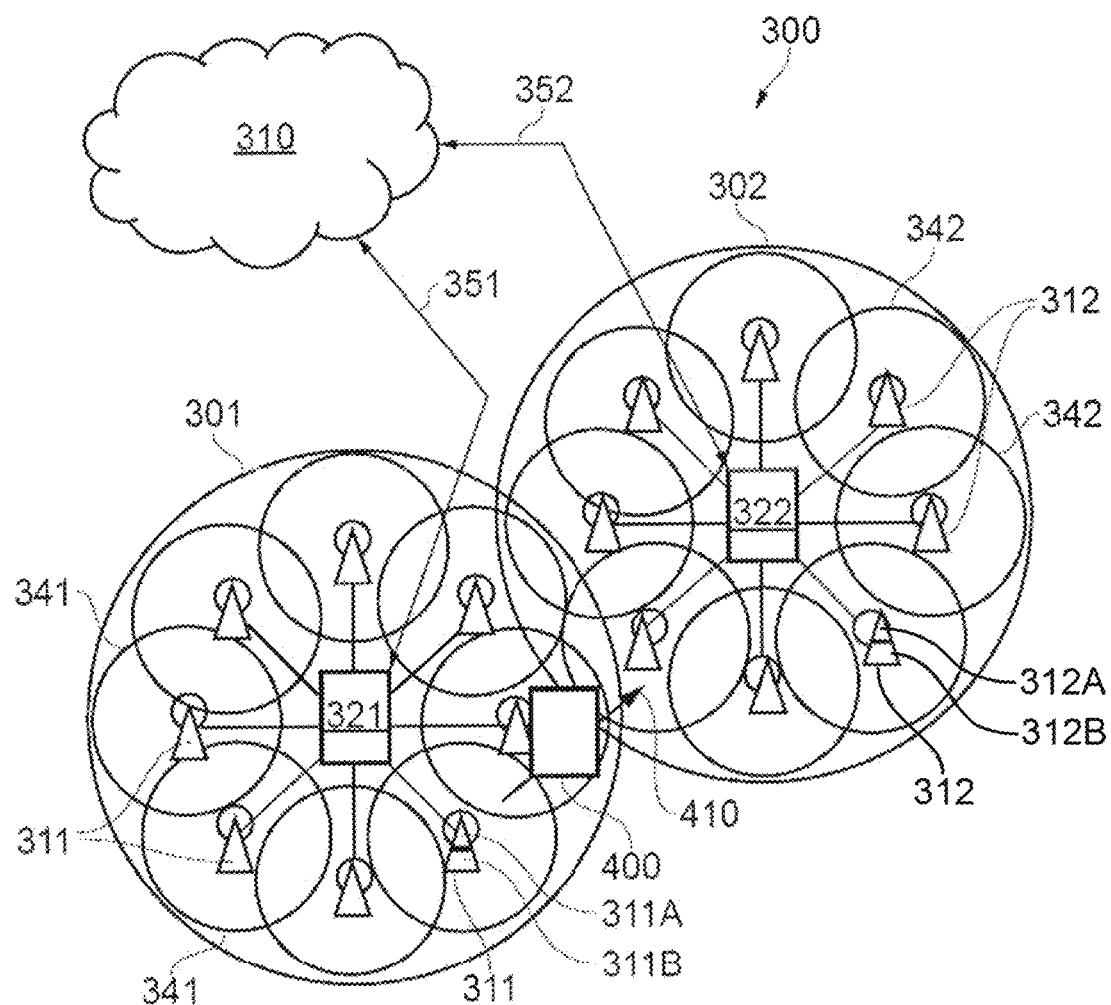
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311b, 312b configured to control the respective distributed units 311, 312.

In terms of broad top-level functionality, the core network component 310 of the telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2, and indeed in networks supporting aspects of different architectures in parallel, for example with co-existence of a legacy radio access network architecture, e.g., as schematically represented in FIG. 1, with a new RAT architecture, e.g., as schematically represented in FIG. 2. It will be appreciated the specific wireless telecommunications architecture in any given implementation is not of primary significance to the principles described herein. In this regard, certain embodiments of the disclosure may be described generally in the context of communications between network infrastructure equipment/access nodes and terminal devices, wherein the specific nature of the network infrastructure equipment/access nodes and terminal devices will depend on the specific network infrastructure for the implementation at hand. For example, in some scenarios the network infrastructure equipment/access nodes may comprise base stations, such as LTE-type base stations 101 as shown in FIG. 1, which are adapted to provide functionality in accordance with the principles described herein, and in other examples the network infrastructure equipment may comprise control units/controlling nodes 321, 322 and/or TRPs 311, 312 of the kind shown in FIG. 2 which are adapted to provide functionality in accordance with the principles described herein, and in yet other scenarios the network infrastructure equipment/access nodes may comprise both base stations, such as LTE-type base stations 101 as shown in FIG. 1 and control units/controlling nodes 321, 322 and/or TRPs 311, 312 of the kind shown in FIG. 2 with at least one being adapted to provide functionality in accordance with the principles described herein.

Mobile communications networks such as the network 100 shown in FIG. 1 and the network 300 shown in FIG. 2 may support pre-configured uplink grant transmissions. A pre-configured uplink grant transmission comprises a transmission of data using pre-determined radio resources, for instance, a pre-configured resource defined within the physical uplink shared channel (PUSCH) of a radio sub-frame structure used by a receiving entity such as an LTE-type base station 101 as shown in FIG. 1 and control units/controlling nodes 321, 322 and/or TRPs 311, 312 of the kind shown in FIG. 2. What may be considered significant about such pre-configured resources is that they may be used for transmissions of data by an entity in the network (for instance, by a terminal device such as the terminal device 104 shown schematically in FIG. 1 or the terminal device 400 shown schematically in FIG. 2) without first requiring an uplink grant to be transmitted to the entity indicating a specific resource allocation to be used for the transmission. In this sense, the resources used for a pre-configured uplink grant transmission can in some respects be considered similar to the resources used in a conventional LTE network for random access channel (RACH) transmission by terminal devices, in as much as said resources are predetermined and able to be used without a terminal device first receiving a dedicated resource allocation from the base station. In some instances, the use of such pre-configured resources can enable uplink data to be transmitted by a terminal device without the terminal device first undergoing a radio resource control (RRC) connection procedure and requesting or otherwise receiving a specific allocation of uplink resources on which to send the data. Radio resources defined for pre-configured uplink grant transmission may be referred to herein as pre-configured uplink resources (PUR), and a pre-configured uplink grant transmission made using PUR resources may be referred to as a PUR transmission.

In wireless telecommunication systems, the successful reception of data by a receiving node (e.g. a network access node such as a base station) can depend on the timing alignment at the receiving node between the reference timing of the radio frame structure used by the receiving node and the timing of the message arrival at the receiving node. For instance, in networks based on the LTE architecture, an uplink transmission to a base station should arrive at the time associated with the target resources in the uplink sub-frame. As such, various strategies are known in the art for managing the timing alignment of received uplink transmissions relative to the radio sub-frame structure, and for attempting to mitigate the effect of potential misalignments on data reception. As is known in the art, the correct timing for uplink transmission on physical uplink shared channel (PUSCH) resources by a terminal device is generally established through control signalling transmitted to the terminal device by a serving base station to configure an appropriate timing advance. It will be appreciated that any non-zero distance between a transmitting node (e.g. a terminal device) and a receiving node (e.g. a base station) will result in a time delay between a given transmission being sent by the transmitting node and received at the receiving node. Such a delay may be referred to herein as a reception delay, and necessitates that a terminal device transmits uplink data in advance of the time at which the transmission is intended to arrive at the receiving node. Since reception of reference signals used by the terminal device to determine the reference timing of the receiving node is also influenced by transmission delay, the timing advance will generally account for the 'round-trip' time of signalling between the two entities. The timing advance to be used by a terminal device is typically determined on the basis of information transmitted to the terminal device by the base station. Such information, often referred to as a timing advance command, may be transmitted to the terminal device as part of a random access response (RAR) message (i.e. as part of the standard RRC connection procedure) and/or via other downlink signalling transmitted by the base station on a periodic or ad hoc basis (e.g. using resources defined in the physical downlink control channel (PDCCH) or physical downlink shared channel (PDSCH) of the radio-frame structure) once the terminal device has completed an RRC connection procedure and is in a connected state. Thus, a terminal device in idle mode which determines it has uplink data to transmit to a base station may first acquire an up-to-date timing advance value from the base station by transmitting a physical random access channel (PRACH) preamble to the base station, and receiving a RAR message comprising a timing advance command.

However, it has been recognised that a terminal device may determine it should send a pre-configured uplink grant transmission using PUR resources while in an unconnected state (e.g. the device may be in a suspended RRC state). As such, the terminal device may not be receiving timing advance commands or other relevant information from a network access node of a cell in which the terminal device is located. Since one of the aspects of PUR transmissions that may be considered advantageous is that they can be made without first requiring an associated RRC connection and/or transmission of a resource allocation request to the network access node, it will be preferable in many instances for a terminal device to transmit a message on PUR resources without incurring the additional signalling overheads associated with acquiring an updated timing advance command from a network access node if an updated timing advance is not needed. Thus, a terminal device which determines it should send a pre-configured uplink grant transmission to a base station using PUR resources may be operable to determine not to acquire an up-to-date timing advance value from the network access node prior to the PUR transmission. In such a scenario, the terminal device may be configured to attempt to use an existing timing advance value to send the PUR transmission, for example a previous timing advance value determined from a timing advance command previously received from the network access node.

However, in certain circumstances, the use of a previously determined timing advance value by a terminal device may be problematic. For instance, it will be appreciated that in circumstances where a terminal device is spatially mobile with respect to a network access node, the distance between the network access node and the terminal device can change. Because the time taken for a signal to travel between two points varies with distance (i.e. in an idealised scenario, the propagation time (t) would be given by t=d/c, where d is the inter-point distance and c is the speed of light), an important feature of scenarios where the terminal device is mobile is that the reception delay for transmissions sent by the terminal device may change. As a consequence, the timing advance used for uplink transmissions may require periodic adjustment in order to ensure messages transmitted by the terminal device are received by a network access node at timings which align with the target resources in the radio sub-frame structure used by the network access node. In circumstances such as those described further herein, wherein a terminal device preferably transmits a pre-configured uplink grant transmission on PUR resources without first establishing a connection with the network access node, and therefore may not receive an updated timing advance prior to the PUR transmission, it is advantageous if a terminal device can determine if a previously determined timing advance value is still valid. For example, if a terminal device establishes at a first point in time that a first timing advance value is suitable for transmitting uplink data to a network access node (e.g. in response to receiving a timing advance command from the network access node associated with the first point in time), and the terminal device subsequently changes position within the cell served by the network access node, it is advantageous if the terminal device can determine whether or not the use of the first timing advance value to send a PUR transmission to the network access node will result in an unacceptable degree of timing misalignment between the received PUR transmission and the target PUR resources defined in the network access node radio sub-frame structure.

In some wireless telecommunications systems the amount of timing misalignment that can be tolerated depends on the duration of a cyclic prefix used for signalling. For example, in wireless telecommunication systems based on the LTE architecture, a 'normal' cyclic prefix duration is 4.7 µs and a target amount of timing misalignment that can be tolerated is around 10% of the cyclic prefix duration. It will be appreciated that these values are exemplary, and that in other instances different cyclic prefix durations and acceptable degrees of misalignment may be defined. However, according to these example parameters, there is a target to keep timing misalignment to below 470 ns between the arrival of a message (e.g. a PUR transmission) at a network access node and the target resources (e.g. PUR resources) defined on its radio sub-frame structure. As discussed above, the timing misalignment is a function of the 'round-trip' propagation time of signalling between a terminal device and a network access node, and varies with distance between the two entities. Thus the target maximum timing misalignment can be expressed in units of either time or distance, since, as previously stated, for an idealised case the transmission delay is related to distance according to t=d/c. Since the permissible misalignment is defined with respect to the round-trip propagation time of signalling between the network access node and the terminal device, the required timing advance (TA) can be expressed as a distance according to TA=c*t/2. Thus in an idealised scenario in which the timing advance was 470 ns, the corresponding distance would be ~70 m. Since 470 ns may in some scenarios be considered the maximum tolerable timing misalignment, a distance of 70 m can be considered to represent the maximum tolerable change in distance between an initially timing-aligned terminal device and network access node, above which the position-dependent misalignment between the entities would exceed the 470 ns threshold. Consequently it will be appreciated that the validity of a previously determined (i.e. 'current') timing advance can in principle be inferred from information about how the distance between the terminal device and the network access node has changed since the current timing advance was determined.

It has previously been recognised that it is may be advantageous for a terminal device making a PUR transmission to be able to determine whether a previously determined timing advance value should be updated or not, such that if the terminal device determines the current timing advance value does not need updating, the terminal device can make the PUR transmission using the current timing advance, without the terminal device requesting or otherwise receiving an updated timing advance from another network entity. In this context a previously determined timing advance established by the terminal device on the basis of a timing advance command or otherwise may be referred to as a 'current' timing advance.

One proposal for determining whether or not a current timing advance value should be updated by a terminal device is to determine whether a measure of a signal strength of network access node reference signalling (e.g. RSRP) received by the terminal device has changed by more than a threshold amount since the point in time when the current timing advance value was determined. This proposal is based on the observation that the RSRP measured by the terminal device depends on the distance between the network access node and the terminal device. Thus, it has been recognised that a sufficiently large change in RSRP may be used to indicate a change in distance between the terminal device and the network access node by a sufficient degree that the currently stored timing advance can no longer be considered valid. Validity in this context will be understood to refer to whether or not the difference between the current timing advance and the required (i.e. 'ideal') timing advance for the current position of the terminal device in the cell is such that a timing misalignment of more than the acceptable degree (e.g. more than 10% of the cyclic prefix duration) would result when a transmission from the terminal device is received at the network access node.

Thus in one example, prior to a terminal device making a PUR transmission to a base station, the validity of a current timing advance value established at a first point in time may be assessed at a second point in time according to the following scheme. A terminal device determines a first measure of RSRP associated with a first point in time at which a current timing advance value is determined. At a second, later point in time, a second measure of RSRP is determined, which is compared with the first measure of RSRP to establish a change in measured RSRP between the first and second points in time. This change in RSRP is then compared with a threshold value: if the change in RSRP exceeds the threshold value, the current value of timing advance is deemed to be invalid, or, in other words, the terminal device is configured to determine the current timing advance should be updated prior to making the PUR transmission. Conversely, if the change in RSRP does not exceed the threshold value, the current value of timing advance is deemed to be valid, or, in other words, the terminal device is configured to determine the current timing advance does not require updating prior to making the PUR transmission. The terminal device according to this example may be configured to either transmit data on PUR resources using the current timing advance (if it is deemed to be valid) or follow a procedure to update the current timing advance value (if it is deemed to be invalid). As set out above, a procedure to update the current timing advance value may comprise following an RRC connection procedure with a serving base station in order to receive a timing advance command comprising an updated timing advance value to be used by the terminal device for PUR transmissions.

However, the inventors have recognised an issue with such approaches to determining the validity of a current timing advance based on a change in measured RSRP. This will be understood from the following discussion of models used to estimate path loss in wireless telecommunication cells.

A path loss model is a means of representing the attenuation of a signal between a transmitting node (e.g. a base station) and receiving node (e.g. a terminal device) as a function of factors comprising, for instance, the propagation distance between the nodes. Thus one simple path loss model is the free space path loss model, wherein the received power (P) of a signal varies according to:

$$P \propto \frac{1}{r^2},$$

where r is the distance between the transmitting and receiving nodes. Where the signal comprises reference signalling, this variation can be expressed in terms of the reference signal received power (RSRP) of the transmitted signal according to:

$$\text{RSRP} = A - (20 \times \log_{10} r),$$

where A is a constant.

Another path loss model, which can be particularly suitable for urban environments, is the Hata model, which can be expressed as:

$$\text{RSRP} = B - ((44.9 - (6.55 \times \log_{10} h)) \times \log_{10} r),$$

where B is a constant, and h is the base station antenna height. For a base station with an antenna height of h=10 m, this model simplifies to:

$$\text{RSRP} = B - (38.4 \times \log_{10} r),$$

Figure 3:
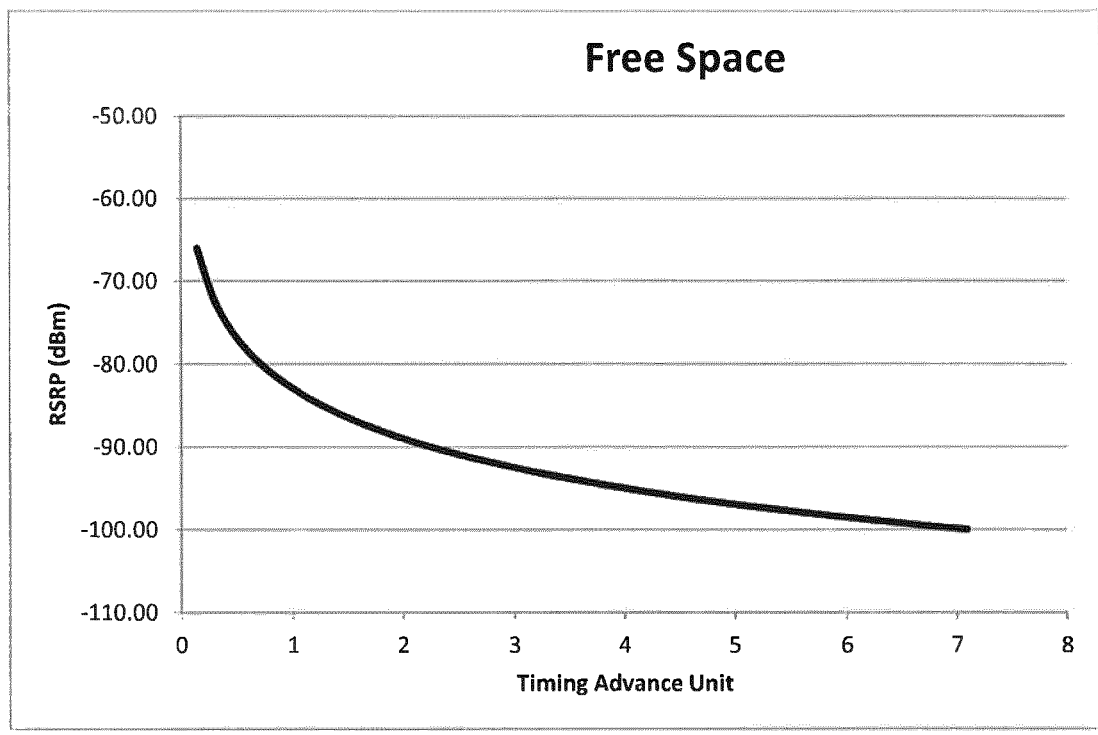
FIGS. 3 and 4 schematically represent two models for the variation in reference signal received power for different distances from an entity transmitting the reference signals where the distance is parameterised in terms of units of timing advance.
Figure 4:
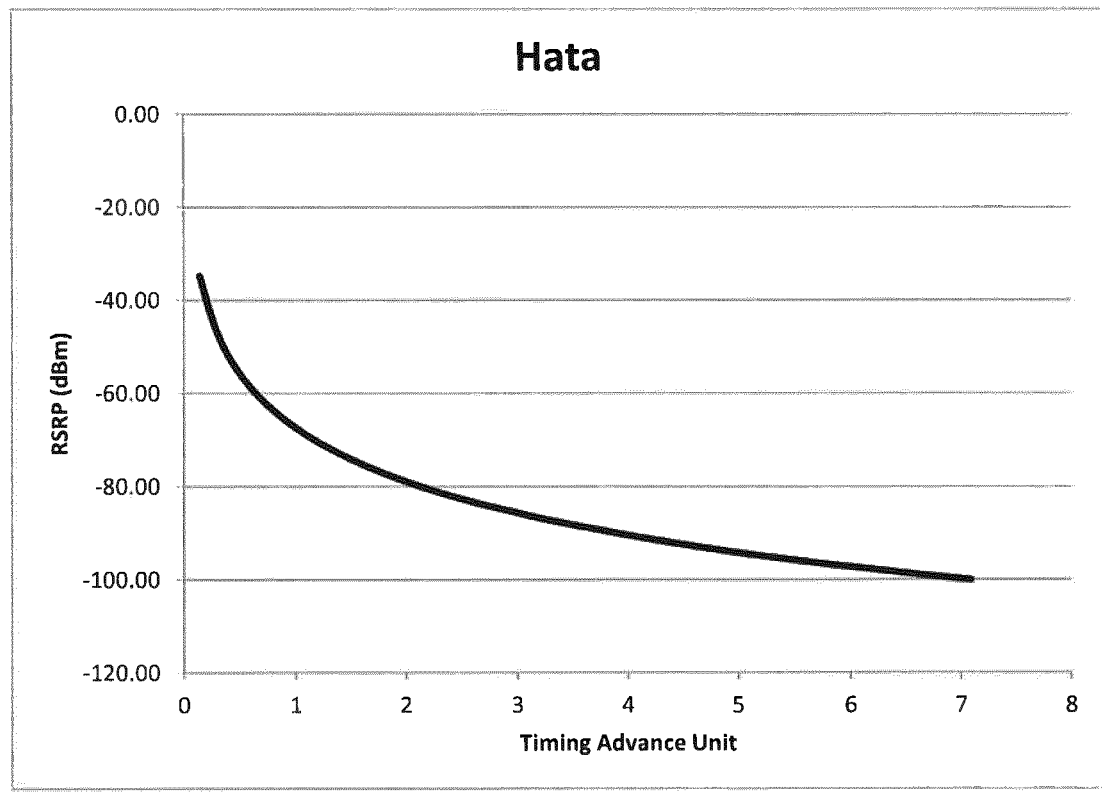

Since, as discussed above, the required timing advance for a transmission is a function of at least the distance between the transmitter and receiver, and measured RSRP is also a function of this distance, it is possible to express a change in measured RSRP as a function of timing advance, as shown schematically in FIGS. 3 and 4.

Thus, FIG. 3 shows the variation in measured RSRP (on the y axis) as a function of units of timing advance according to the free space path loss model described above. FIG. 4 shows the variation in measured RSRP (on the y axis) as a function of units of timing advance according to the Hata model detailed above. In both instances the timing advance on the x-axis is quantified in units of 470 ns (i.e. in units of 10% of the normal cyclic prefix duration), the measured RSRP is expressed relative to the transmitted power (i.e. in dBm), and the operating parameters of the cell are assumed to be configured such that the measured RSRP is −100 dBm at the edge of a 500 m cell. It will be appreciated that these parameters are for illustrative purposes, and other cell parameters could equally be applied.

As is evident from FIGS. 3 and 4, the non-linear relationship between the measured RSRP and the timing advance value entails that the change in measured RSRP equating to a unit change in the timing advance varies as a function of the initial value of measured RSRP/timing advance. If the initial value of timing advance is low (for example, between 0 and 1 units in either of FIGS. 3 and 4), the change in RSRP corresponding to a unit change in timing advance value is comparatively high. Thus, for example, for the Hata model shown graphically in FIG. 4, a change in timing advance between 0 and 1 units (corresponding to a terminal device moving between positions at distances from the base station of ~0 m to ~70 m respectively) corresponds to a drop in measured RSRP of −33 dB. However, if the initial value of timing advance is high (for example, between 6 and 7 units in either of FIGS. 3 and 4), the change in RSRP corresponding to a unit change in timing advance value will be comparatively low. Thus, for example, for the Hata model represented in FIG. 4, a change in timing advance between 6 and 7 units (corresponding to a terminal device moving between positions at distances from the base station of ~420 m to ~490 m respectively) corresponds to a drop in RSRP measured at the terminal device of ~3 dB.

As a consequence of this non-linearity between measured RSRP and timing advance value, the inventors have recognised the use of a fixed threshold value of change in measured RSRP is likely to be inappropriate in some situations for indicating the validity of a current value of timing advance to be used by a terminal device. As discussed above, a comparatively large threshold value may be suitable close to the centre of a cell (where a unit change in timing advance value corresponds to a comparatively large change in measured RSRP), whereas the same threshold value might be unsuitable closer to the cell edge, where a unit change in timing advance corresponds to a substantially lower change in measured RSRP. For instance, according to the Hata model represented in FIG. 4, if an initial value of timing advance used by the terminal device was 0 units (i.e. an advance of 0 ns), a threshold of 33 dB might be suitable for determining the validity of the timing advance following a change in position within the cell, since a <33 dB change in RSRP would correspond to a timing advance change of <470 ns. According to the abovementioned discussion of cyclic prefix length, this change would not exceed the maximum allowable degree of timing misalignment (i.e. 10%). However, if the current value of the timing advance was 5 units (i.e. 2350 ns) and the terminal device then changed position in the cell, the maximum allowable change in timing advance (i.e. 470 ns) would be exceeded without the threshold of change in RSRP being met.

Thus in accordance with embodiments of the present approach, a terminal device is operable to determine whether or not a current timing advance should be updated based on a comparison between an indication of a change in distance between the terminal device and another entity and a timing advance validity threshold which is determined based on an indication of a distance between the terminal device and the other entity.

Figure 5:
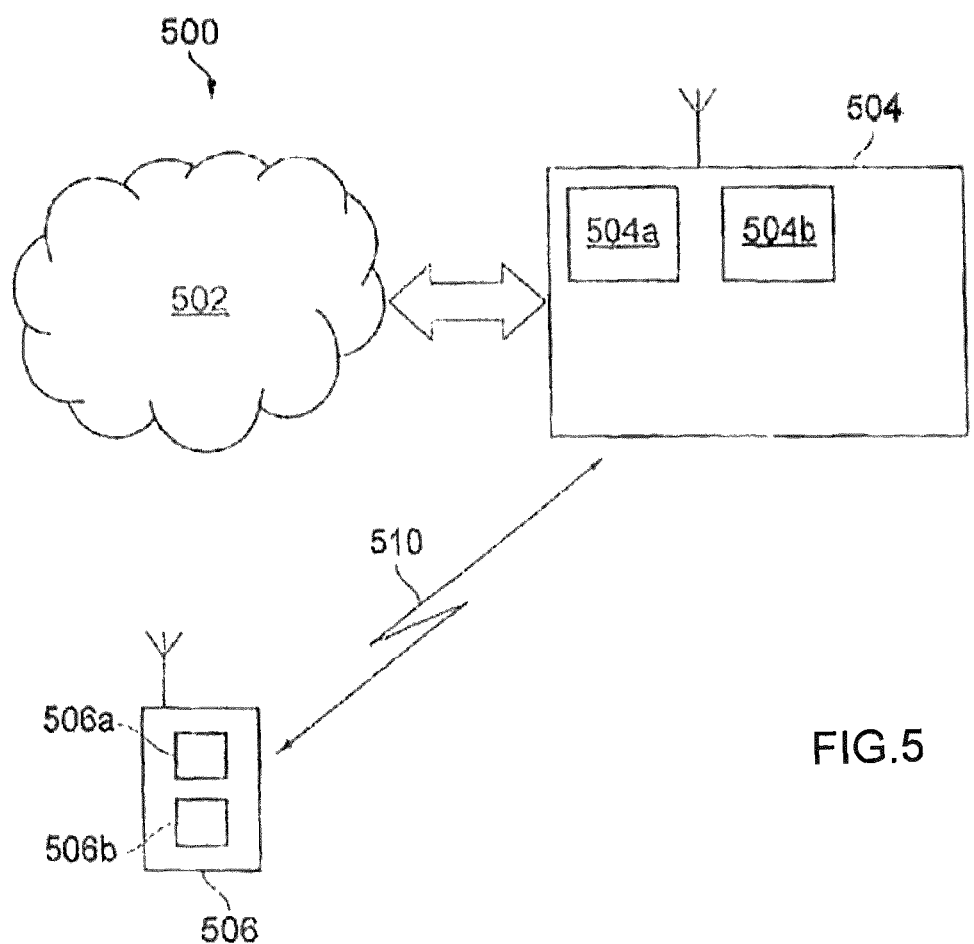
FIG. 5 schematically represents some aspects of a wireless telecommunication network in accordance with certain embodiments of the disclosure.

FIG. 5 schematically shows some further details of a telecommunications system 500 supporting communications between a radio access node 504 and a terminal device 506 according to certain embodiments of the present disclosure. For the sake of an example, the telecommunications system 500 here is assumed to be based broadly around an LTE-type architecture that may also support other radio access technologies, either using the same hardware as represented in FIG. 5 with appropriately configured functionality, or separate hardware configured to operate in association with the hardware represented in FIG. 5. However, the specific network architecture in which embodiments of the disclosure may be implemented is not of primary significance to the principles described herein. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current wireless telecommunications systems standards and other proposals for operating wireless telecommunications systems. The network access node 504 may, for convenience, sometimes be referred to herein as a base station 504, it being understood this term is used for simplicity and is not intended to imply any network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part 502 coupled to a radio network part. The radio network part comprises the radio network access node 504 and the terminal device 506. It will of course be appreciated that in practice the radio network part may comprise more network access nodes serving multiple terminal devices across various communication cells (e.g. as schematically represented in FIG. 1). However, only one network access node and one terminal device are shown in FIG. 5 in the interests of simplicity.

The terminal device 506 is arranged to communicate data to and from the network access node (base station/transceiver station) 504 or another network access node in the wireless telecommunications system according to coverage. Where the terminal device is in coverage and in a position to communicate with a particular network access node (e.g. network access node 504 in FIG. 5) it may be referred to as being attached to that network access node while nearby network access nodes that the terminal device could attach to, for example if it were to move, may be referred to as neighbouring network access nodes. The network access node 504 is communicatively connected to the core network part 502 which is arranged to perform routing and management of mobile communications services for terminal devices in the telecommunications system 500 via the network access node 504. The connection from the network access nodes 504 to the core network 502 may be wired or wireless. In order to maintain mobility management and connectivity, the core network part 502 also includes a mobility management entity, MME, which manages the service connections with terminal devices operating in the communications system, such as the terminal device 506. As noted above, the operation of the various elements of the communications system 500 shown in FIG. 5 may be in accordance with known techniques apart from where modified to provide functionality in accordance with embodiments of the present disclosure as discussed herein.

The terminal device 506 is adapted to support operations in accordance with embodiments of the present disclosure as discussed herein. The terminal device 506 is a PUR capable terminal device adapted for transmitting at least some uplink data on preconfigured uplink resources to the network access node (base station) 504 over a radio interface 510. Certain embodiments of the disclosure relate to approaches for determining if a currently configured timing advance for the terminal device 506 to use for PUR transmissions should be considered valid or invalid. If the timing advance is determined to be valid, the terminal device 506 may continue making PUR transmissions using the timing advance, and if the timing advance is determined to be invalid, the terminal device 506 may establish a new timing advance before continuing to make PUR transmissions. In this regard it will be appreciated the PUR transmissions themselves may in some examples be made in accordance with any previously proposed approaches for making PUR transmissions, for example in terms of what resources are made available for use by the terminal device 506 for PUR transmissions and how the terminal device 506 should select from those resources for a give PUR transmission.

The terminal device 506 comprises transceiver circuitry 506a (which may also be referred to as a transceiver/transceiver unit) for transmission and reception of wireless signals and processor circuitry 506b (which may also be referred to as a processor/processor unit) configured to control the terminal device 506. The processor circuitry 506b may comprise various sub-units/sub-circuits for providing desired functionality as explained further herein. These sub-units may be implemented as discrete hardware elements or as appropriately configured functions of the processor circuitry. Thus the processor circuitry 506b may comprise circuitry which is suitably configured/programmed to provide the desired functionality described herein using conventional programming/configuration techniques for equipment in wireless telecommunications systems. The transceiver circuitry 506a and the processor circuitry 506b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 506 will in general comprise various other elements associated with its operating functionality, for example a power source, user interface, and so forth, but these are not shown in FIG. 5 in the interests of simplicity.

The network access node 504 comprises transceiver circuitry 504a (which may also be referred to as a transceiver/transceiver unit) for transmission and reception of wireless signals and processor circuitry 504b (which may also be referred to as a processor/processor unit) configured to control the respective network access node 504 to operate in accordance with embodiments of the present disclosure as described herein. Thus, the processor circuitry 504b for the network access node 504 may comprise circuitry which is suitably configured/programmed to provide the desired functionality described herein using conventional programming/configuration techniques for equipment in wireless telecommunications systems.

The transceiver circuitry 504a and the processor circuitry 504b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the network access node 504 will in general comprise various other elements associated with its operating functionality, such as a scheduler.

Thus, the network access node 504 is configured to communicate data with a terminal device 506 according to an embodiment of the disclosure over communication link 510.

As noted above, the inventors have recognized the need for a method of determining whether a timing advance value used by a terminal device needs to be updated based on an indication of a change in distance between the terminal device and a serving network access node (e.g. an indication comprising a change in measured RSRP), wherein the method is applicable to terminal device positions across the entire cell served by the network access node.

Thus, according to some embodiments, a terminal device (such as the terminal device 506 shown schematically in FIG. 5) is configured to determine a current timing advance value to be used for transmitting data to another entity in the wireless telecommunication system. For example, according to some embodiments the other entity is a network access node such as the base station 504 shown schematically in FIG. 5, and the current timing advance value may be determined by the terminal device on the basis of a timing advance command received from the network access node. As described further herein, the other entity may comprise a transceiver station, nodeB, e-nodeB, g-nodeB, TRP, or a further terminal device configured to communicate with the first terminal device in a device-to-device manner. According to some embodiments, the terminal device and/or other entity comprise MTC-type terminal devices. According to some embodiments the timing advance command comprises a value of timing advance to be used when transmitting data to the at least one other entity in the wireless telecommunications system, and according to other embodiments it comprises other information, such as a function, from which the terminal device can itself infer a value of timing advance to use for transmitting data to the other entity. As discussed further herein, a current timing advance value may be determined by the terminal device on the basis of a message comprising a timing advance command which is received from another entity, for instance, a network access node. The timing advance command may be received from the other entity in response to the terminal device initiating a random access procedure with the other entity. Alternatively, or in addition, a timing advance command may be received from the other entity via messaging in control or user plane resources whilst the terminal device is connected to the other entity following an appropriate connection procedure (such as the RRC connection procedure set out in the 3GPP standard). According to some embodiments, the terminal device may receive a timing advance command without first making a request to the other entity.

Herein references to 'current timing advance' can broadly be taken to refer to a timing advance value which has been determined by the terminal device at a previous point in time, and which is to be used when sending uplink transmissions to at least one further entity in the wireless telecommunications system. Though the current timing advance value will in some instances be determined on the basis of messaging received from another entity, in other instances it will be determined by the terminal device without external influence.

According to some embodiments, the terminal device is further configured to determine an indication of a distance between the terminal device and the other entity in the wireless telecommunications network. It will be appreciated that this indication of distance can comprise any measure which is a function of the distance between the two entities. For example, according to some embodiments the indication of a distance between the terminal device and the other entity is based on a measure of a signal strength of signalling received from the other entity. For example, in some examples the other entity is a network access node, and the measure of signal strength comprises a measure of reference signal received power (RSRP) of reference signalling transmitted by the network access node and received by the terminal device. However, in principle such an approach may use a measure of signal strength of any signalling received from the other entity. According to some embodiments the measure of signal strength is used to determine a distance between the terminal device and the base station, for example, using a path loss model such as a free space path loss model or a Hata model, and in other instances the measure of signal strength is itself used as the indication of distance (i.e. without any conversion). Thus according to some embodiments, the indication of a distance between the terminal device and the other entity comprises a measure of RSRP of reference signalling transmitted by the other entity and received by the terminal device.

According to some embodiments, the indication of distance between the terminal device and the other entity is determined based on the current timing advance. For example, when the terminal device determines a current timing advance for transmitting data to another entity in the wireless telecommunication system, according to any of the approaches described herein for determining a timing advance value, the indication of a distance between the terminal device and the other entity determined by the terminal device may also be taken to comprise the value of this current timing advance. This determination may take place either simultaneously with the determination of the current timing advance value, or at a later point in time. It will be appreciated that in embodiments where the indication of distance between the terminal device and the other entity comprises a current timing advance, this value may be expressed in a variety of ways, for example, as a period of time or as a distance. The indication of distance may be expressed in terms of units of timing advance, defined, for instance, in accordance with a definition in which a single unit of timing advance corresponds to the maximum tolerable degree of timing misalignment as defined for the wireless telecommunication system on the basis of, for instance, a predetermined fraction of the cyclic prefix duration. Thus, in one example, a unit of timing advance is defined as 10% of the cyclic prefix duration (e.g. 470 ns or 70 m).

In many embodiments of the approach, the time and/or position at which the indication of a distance between the terminal device and the other entity is determined will be closely associated with the time and/or position at which the current timing advance is determined. For example, when the terminal device determines a current timing advance for transmitting data to another entity in accordance with the approaches described herein, the terminal device may be operable to determine the indication of distance at a time and/or distance from the other entity which is closely associated with the time and/or distance from the other entity at which the current timing advance is determined.

According to some embodiments, the indication of a distance between the terminal device and the other entity may be determined via GPS signalling received by the terminal device, and/or via information received in signalling received by the terminal device from one or more other entities in the wireless telecommunications system.

According to some embodiments, the terminal device is operable to determine a timing advance validity threshold based on the indication of a distance between the terminal device and the other entity. The timing advance validity threshold comprises a criterion to be used by the terminal device in determining whether or not the current timing advance should be updated. What may be considered significant about this approach is that in some instances, the timing advance validity threshold takes different values depending on the indication of a distance between the between the terminal device and the other entity. According to some embodiments, the timing advance validity threshold is determined based on the indication of a distance between the between the terminal device and the other entity by taking into account a path loss model. For instance, according to the Hata path loss model shown graphically in FIG. 4, values of timing advance on the x-axis are related to an indication of distance (measured RSRP) on the y-axis. Thus according to some embodiments a timing advance validity threshold is determined by differentiating a function which relates the measured RSRP to an indication of the distance between the terminal device and the other entity. Thus, with respect to the exemplary model shown graphically in FIG. 4, differentiating the function at lower values of timing advance (i.e. closer to the cell centre) would return a comparatively high gradient, and differentiating the function at higher values of the timing advance (i.e. closer to the cell edge) would return a comparatively lower gradient value. Thus according to some embodiments, the timing advance validity threshold is determined based on a function of the gradient value returned by differentiating a Hata model, a free space path loss model, or other path loss model or function, with respect to an indication of distance between the terminal device and the base station, expressed in terms of timing advance value or other suitable units.

According to some embodiments, the determination of a timing advance validity threshold value based on an indication of a distance between the terminal device and the other entity comprises comparing the indication of the distance between the terminal device and the other entity with at least one predetermined range of values, and determining to use as a timing advance validity threshold a candidate timing advance validity threshold value associated with a range into which the indication of the distance falls. The at least one predetermined range of values may be transmitted to the terminal device by another entity in the wireless telecommunications network, or defined by standard, or determined by the terminal device. In one example, the at least one predetermined range of values comprises a range of values of measured signal strength of reference signalling (e.g. measured RSRP) received by the terminal device from the other entity, and the indication of the distance between the terminal device and the other entity comprises a measure of the signal strength of reference signalling received by the terminal device from the other entity. According to the present example, each of the at least one predetermined ranges of values is associated with a corresponding candidate timing advance validity threshold. As described further elsewhere herein, the determination of a suitable candidate threshold value to be associated with a given predetermined range of values may take into account a path loss model such as a free space model, a Hata model, or another model representing path loss in a telecommunications cell.

TABLE 1

| Indication of distance between terminal device and other entity (expressed as RSRP) | Timing advance validity threshold (expressed as change in RSRP) |
| --- | --- |
| >−67 dBm | 33 dB |
| −79 dBm < RSRP ≤ −67 dBm | 11 dB |
| −86 dBm < RSRP ≤ −79 dBm | 7 dB |
| −90 dBm < RSRP ≤ −86 dBm | 4 dB |
| ≤−90 dBm | 3 dB |

Thus, in embodiments in which at least one predetermined range of values is used, the terminal device determines a timing advance validity threshold value to use by comparing the indication of the distance between the terminal device and another entity with the at least one predetermined ranges of values, and, if the indication of distance falls into one of the at least one predetermined ranges, determining that the corresponding candidate threshold value associated with the range should be used as a timing advance validity threshold value. An example of this approach is now described with reference to Table 1. The left-hand column comprises a set of predetermined ranges of values of indicated distance between the terminal device and another entity, expressed in Table 1 in terms of the measured RSRP of reference signals transmitted by the other entity and received at the terminal device. Thus the first row of the first column comprises a predetermined range of values of RSRP>−67 dBm. The right-hand column comprises a set of candidate threshold values, each expressed in terms of a change in the measured RSRP. In accordance with the current example, if the indication of the distance between the terminal device and the other entity, here comprising a measure of RSRP at the terminal device, was −50 dBm in a particular instance, the terminal device would determine that this value is within the predetermined range 'RSRP>−67 dBm' represented by the first row of the left-hand column. Accordingly, the terminal device would determine that the corresponding candidate threshold value of 33 dB in the right-hand column should be used as the timing advance validity threshold value. It will be appreciated that the ranges and candidate thresholds shown in FIG. 1 are exemplary, and different values could be used in practice.

The ranges of values used in the aforementioned example are exemplary, and in other embodiments, the at least one predetermined range of values may comprise ranges of any other suitable indication of distance between the terminal device and the other entity. For instance, according to some embodiments, each of at least one predetermined range of values comprises a range of values of timing advance, and an indication of the distance between the terminal device and the other entity determined by the terminal device comprises a current timing advance value determined by the terminal device. As in the previously described embodiments, each of the at least one predetermined range of values is associated at the terminal device with at least one corresponding candidate threshold value which may be selected as a timing advance validity threshold. The terminal device determines one or more timing advance validity threshold values to use in accordance with the present embodiments by comparing the current timing advance value with the at least one predetermined range of values of timing advance, and, if the current timing advance value falls into one of the at least one predetermined ranges, determining that the corresponding candidate threshold value(s) associated with the range should be used as the timing advance validity threshold value(s).

TABLE 2

| Indication of distance between terminal device and other entity (expressed as units of timing advance, wherein 1 unit = 470 ns) | Timing advance validity threshold (expressed as change in RSRP) |
| --- | --- |
| <1 | 33 dB |
| 1 ≤ TA < 2 | 11 dB |
| 2 ≤ TA < 3 | 7 dB |
| 3 ≤ TA < 4 | 4 dB |
| TA ≥ 4 | 3 dB |

An example of this approach is described with reference to Table 2. The left-hand column comprises an exemplary set of predetermined ranges of values of indications of distance between the terminal device and the other entity, expressed in Table 2 in terms of units of timing advance. In this instance, a unit of timing advance is defined as 470 ns, which, as described further herein, corresponds to the maximum tolerated timing misalignment for transmission in an LTE sub-frame using the normal cyclic prefix. However, it will be appreciated that other units of timing advance could be used in practice. In this example, the first row of the first column comprises a predetermined range of TA<1 unit. The right-hand column comprises a set of candidate threshold values, expressed in terms of a change in the RSRP measured at the terminal device. In accordance with the current example, if the current timing advance determined by the terminal device is assumed to be 0.5 units (i.e. 235 ns) in a particular scenario, the terminal device would determine that this value is within the predetermined range 'TA<1 unit' represented by the first row of the left-hand column. Accordingly, the terminal device would determine that the corresponding candidate threshold value of 33 dB in the right-hand column should be used as the timing advance validity threshold value. It will be appreciated that each of the ranges and candidate thresholds shown in Table 2 are exemplary, and different values could be used in practice.

The embodiments illustrated with reference to Tables 1 and 2 can be considered to represent approaches in which a 'look-up table' is used to determine a timing advance validity threshold value to use, on the basis of an indication of a distance between the terminal device and the other entity. Thus in some examples, at least one predetermined range of values and at least one corresponding timing advance validity threshold for each of the at least one predetermined ranges comprises a look-up table, as schematically represented by the exemplary Tables 1 and 2.

There are a number of ways in which a look-up table can be configured for use by a terminal device to determine a timing advance validity threshold on the basis of comparing an indication of the distance between the terminal device and another entity with at least one predetermined range of values. For example, in Tables 1 and 2 the relationship between each predetermined range of values of indicated distance between the terminal device and another entity and the corresponding candidate threshold value is based on the Hata path loss model described further herein. Values for ranges and candidate threshold values to be used in a look-up table can be based on any suitable path loss model for a cell, which may for example be determined on the basis of experimentation and/or simulation when the cell is planned and deployed, or at any point before or after. What may in many instances be considered significant about the relationship between a given predetermined range of values and the corresponding candidate threshold value is that for an initial distance dl between the terminal device and the other entity, such that the indication of distance falls within the predetermined range of values, a change in distance (Δd) sufficient to change the required timing advance value by more than the allowed tolerance cannot take place without the indication of a change in distance (e.g. a change in measured RSRP) exceeding the corresponding candidate threshold value. The 'allowed tolerance' in this context corresponds to the maximum permissible degree of timing misalignment for transmissions received at the other entity, as described in detail elsewhere herein. It will be appreciated that path loss data resulting from experimental measurements and/or simulations may be used to determine such relationships between each of one or more ranges of indicated distance and the corresponding timing advance validity threshold value(s) for each range. A look-up table, or one or more values of ranges and thresholds used to populate a look-up table, may be transmitted to the terminal device via messaging from another entity in the wireless telecommunications system, such as a network access node, or may be defined by standard, or may be otherwise provided to the terminal device in accordance with alternative methods of data transfer.

According to some embodiments, more than one timing advance validity threshold may be determined based on an indication of a distance between a terminal device and another entity. This reflects the fact that the rate of change of an indication of a change in distance between the terminal device and the other entity may differ depending on whether the change in distance between the terminal device and the other entity is positive or negative. This can be seen, for example, by considering the Hata model shown graphically in FIG. 4. If, according to one exemplary scenario, an initial timing advance is assumed to be 2 units, it can be seen that the corresponding change in measured RSRP (which comprises an indication of a change in distance) will be greater over the shift from 2 units of timing advance to 1 unit, than it is for a shift from 2 units of timing advance to 3 units. In other words, a single unit of change of timing advance brought about by movement of the terminal device towards the cell centre corresponds to a greater shift in measured RSRP than does a single unit of change of timing advance brought about by movement towards the cell edge. Thus, given an indication of a distance between the terminal device and another entity, and when determining at the terminal device whether or not a current timing advance should be updated based on a comparison between an indication of a change in distance between the terminal device and the other entity and a timing advance validity threshold, it may be appropriate to make the comparison using a first timing advance validity threshold if the change in distance is positive, and a second timing advance validity threshold if the change in distance is negative. It will be appreciated that both first and second timing advance validity thresholds can be determined based on the same indication of a distance between the terminal device and the other entity. As described elsewhere herein, the relationship between an indication of distance between the terminal device and the other entity and a timing advance validity threshold can be determined taking into account a path loss model such as the free space model or Hata model. Where two timing advance validity threshold values are used, they may be associated with a corresponding value of indication of distance between the terminal device and the other entity, or a range of such values, either by use of a look-up table, or via a function, or in any other suitable way. What is significant is that the terminal device, having an indication of a distance between itself and another entity, is configured to establish the two timing advance threshold values to use on the basis of the indication of the distance between itself and another entity. Thus according to some embodiments, in which a terminal device has determined a first timing advance validity threshold based on an indication of a distance between the terminal device and another entity, the terminal device is operable to determine a second timing advance validity threshold based on the indication of a distance between the terminal device and the other entity, to further determine whether an indication of a change in distance between the terminal device and the other entity is positive or negative, and when determining whether or not the current timing advance should be updated based on a comparison between the indication of a change in distance between the terminal device and the other entity and a timing advance validity threshold, to use a first timing advance validity threshold if the indication of a change in distance is positive, and to use the second timing advance validity threshold if the indication of a change in distance is negative.

According to some embodiments, a plurality of look-up tables is defined for use by the terminal device, and the terminal device is operable to determine which of the plurality of look-up tables to use to determine one or more timing advance validity thresholds. This determination may be made by the terminal device itself, or may be made in response to signalling from another network entity indicating a suitable look-up table or set of such tables to use. In one example, the terminal device determines to use a specific look-up table on the basis of an indication comprised in a system information block (SIB) decoded from signalling received from another entity in the wireless telecommunications network (e.g. a network access node such as a base station). According to some embodiments, the terminal device receives control signalling from another entity in the wireless telecommunications system providing configuration information for pre-configured uplink resource (PUR) transmissions (for instance, indicating the location of the pre-configured resources in the uplink radio sub-frame structure), and said configuration information comprises an indication of a look-up table the terminal device should use for establishing one or more timing advance validity thresholds. For example, a first table provided to the terminal device in accordance with the approach described herein might be populated with values determined on the basis of a Hata model, and a second such table might be populated with values determined on the basis of a free space path loss model.

According to some embodiments, the terminal device is operable to determine the timing advance value should not be updated if an indication of distance between the terminal device and another entity is within a predetermined range of values. For example, some values of indicated distance between the terminal device and the other entity may be associated with an indication that the terminal device should assume a current timing advance is valid. This could be the case, for instance, for a range of values of an indication of distance between the terminal device and another entity (e.g. a network access node) which corresponds to the terminal device being close to the centre of a cell served by the other entity. Thus in accordance with some embodiments, a terminal device is operable to determine the current timing advance should not be updated if an indication of a distance between the terminal device and the other entity is within a predetermined range of values. Table 3 shows an exemplary look-up table that can be used in accordance with some examples of this embodiment. The left-hand column will be understood from the left-hand column of Table 1, and comprises a set of predetermined ranges of indicated distance between a terminal device and another entity, expressed in terms of measured RSRP of reference signalling received by the terminal device from the other entity. Each entry in the right-hand column of Table 3 comprises one or more corresponding criteria to be applied by the terminal device if an indication of a change in distance between the terminal device and the other entity falls within the associated range in the left-hand column. In accordance with some embodiments, and as described above, for one or more of the predetermined ranges of the indication of distance, the current timing advance is automatically considered valid by the terminal device. Referring to the example of Table 3, this criterion applies for values of indicated distance between the terminal device and the other entity, expressed here in terms of measured RSRP, in the range $>-67$ dBm. Thus a terminal device operable to use the look-up table represented by Table 3 to determine a timing advance validity criterion, would, upon determining it should send a PUR transmission, and determining a measured RSRP value of $>-67$ dBm, assume its current timing advance value is valid (i.e. should not be updated) and would proceed to send a PUR transmission using the current timing advance value without initiating a timing advance update procedure. According to some embodiments, if an indication of a distance between the terminal device and the other entity is within a predetermined range of values, the terminal device determines a timing advance validity threshold which has a sufficiently large value (e.g. an infinitely large value) that in practice the threshold will never be exceeded regardless of the magnitude of a given indication of a change in distance between the terminal device and the other entity.

TABLE 3

| Indication of distance between terminal device and other entity (expressed as RSRP) | Criteria to apply to determine whether or not the current timing advance should be updated |
|---|---|
| >−67 dBm | Timing advance automatically considered valid |
| −79 dBm < RSRP ≤ −67 dBm | First timing advance validity threshold = 11 dB |
| −86 dBm < RSRP ≤ −79 dBm | First timing advance validity threshold = 7 dB |
| −90 dBm < RSRP ≤ −86 dBm | First timing advance validity threshold = 4 dB and second timing advance validity threshold = 3 dB |
| ≤−90 dBm | First timing advance validity threshold = 3 dB and second timing advance validity threshold = 3 dB |

According to some embodiments, the terminal device is operable to determine an indication of a change in distance between the terminal device and another entity. This may comprise any indication which is suitable for indicating a change in distance, and may be based, for example, on a measurement of a change in characteristics of signalling received from the other entity by the terminal device. Alternatively or in addition, the terminal device may determine an indication of a change in distance on the basis of receiving GPS signalling, or on the basis of information received in signalling from another entity in the network (for example, from a network access node). According to some embodiments, the indication of a change in distance between the terminal device and the other entity comprises a measure of a change in a signal strength of signalling received from the other entity. Thus in one example, the signalling received from the other entity comprises reference signalling, and the measure of a change in signal strength comprises a measure of a change in RSRP of the reference signalling. In such an example, the terminal device may determine a first measure of RSRP at a first point in time, determine a second measure of RSRP at a second point in time, and determine the indication of a change in distance between the terminal device and the other entity at the second point in time comprises the difference in the first and second measure of RSRP. The first point in time may generally be associated with a time at which the terminal device determines an indication of a distance between the terminal device and the other entity, in accordance with the approaches described elsewhere herein. Thus according to some embodiments, the terminal device is operable to determine an indication of a distance between the terminal device and another entity at a first point in time, determine a timing advance validity threshold based on the indication of a distance determined at the first point in time, and, at a second point in time, determine an indication of a change in distance between the terminal device and the other entity wherein the indication of the change in distance relates to a change in distance which occurs between the first point in time and the second point in time.

According to some embodiments, the terminal device is operable to determine whether or not a current timing advance should be updated based on a comparison between an indication of a change in distance between the terminal device and the other entity and a timing advance validity threshold. A number of approaches to determining a timing advance validity threshold based on the indication of a distance between the terminal device and another entity are described herein. Thus in one example the indication of a distance comprises a measure of RSRP received by the terminal device from the other entity. The terminal device is operable to compare the indication of distance with ranges of values in a look-up table, and determine to use as a timing advance validity threshold a corresponding threshold value associated with a range of values into which the indication of distance falls. According to some embodiments, the threshold value comprises an indication of a change in signal strength of signalling received from the other entity. Thus, according to some embodiments, the terminal device is operable to compare an indication of a change in distance, expressed as a change in measured RSRP, with a timing advance validity threshold expressed as a maximum allowed change in measured RSRP. If the terminal device determines the indication of a change in distance exceeds the timing advance validity threshold, the terminal device is operable to determine the current timing advance should be updated, and if the indication of a change in distance is less than or equal to the timing advance validity threshold, the terminal device is operable to determine the current timing advance is still valid. This procedure may be carried out at a point at which the terminal device determines a PUR transmission should be sent to the other entity. If the terminal devices determines the current timing advance should be updated, it may be operable to initiate a procedure to acquire an updated timing advance before making the PUR transmission. If the terminal device determines the current timing advance should not be updated, the terminal device may be operable to make the PUR transmission using the current timing advance.

According to some embodiments, the terminal device is operable not to use a measure of a change in signal strength of signalling received from the other entity to determine whether or not the current timing advance should be updated if the indication of distance between the terminal device and the other entity is within a predetermined range of values. This is based on the recognition that when measured signal strength (e.g. RSRP) is low, the determination of timing advance is more sensitive to changes in signal strength (as shown schematically by the path loss models represented graphically in FIGS. 3 and 4). At lower values of measured signal strength (e.g. when RSRP is measured close to a cell edge) the influence of lower measurement sensitivity and the greater susceptibility of measurements to poor radio conditions are likely reduce the accuracy of timing advance validity assessments based on comparing a change in measured signal strength with a timing advance validity threshold, as described further herein. Thus, according to some embodiments, the terminal device is operable to use an alternative scheme to determine whether the timing advance should be updated if the indication of distance between the terminal device and the other entity is within a predetermined range of values. The predetermined range of values may be defined such that it corresponds to a range of distances between the terminal device and the other entity for which the signal strength of signalling received from the other entity is below a certain threshold value. Such a threshold value can be chosen as a value below which the signal strength is known to be unsuitable as a means for determining position and/or changes in timing advance due to poor sensitivity. According to some embodiments, the terminal device is further operable to use an alternative scheme to determine whether the timing advance should be updated if the indication of distance between the terminal device and the other entity is within the predetermined range of values. Thus in one example, the indication of a distance between the terminal device and the other entity is based on a measure of RSRP received from the other entity. If the measured RSRP is above the predetermined threshold, the terminal device is configured to determine validity of a current timing advance value by comparing an indication of a change in distance between the terminal device and the other entity comprising a measure of a change in RSRP received from the other entity with a timing advance validity threshold. However, if the measurement of RSRP is below a predetermined threshold (e.g. −90 dBm), the terminal device is configured to use an alternative scheme to determine whether or not the timing advance should be updated. Thus according to some embodiments, the terminal device is operable to use a positioning-based scheme to determine whether or not the current timing advance should be updated if the indication of a distance between the terminal device and the other entity is within a predetermined range of values. According to one embodiment of a positioning-based scheme, the terminal device is operable to determine an indication of a change in distance between the terminal device and the other entity using information derived from GPS signalling, and determine whether or not the current timing advance should be updated based on a comparison between the indication of a change in distance between the terminal device and the other entity and a timing advance validity threshold. In other embodiments, if the indication of distance between the terminal device and the other entity is within a predetermined range of values, the terminal device is configured to transmit signalling to the other entity to request an updated timing advance value (e.g. by transmitting a RACH preamble to the other entity and receiving a timing advance command in a RAR message).

According to some embodiments, a terminal device operable to use a timing advance validity threshold in accordance with approaches described herein may be operable to use at least one additional criterion to determine, based on an indication of a distance between the terminal device and another entity, whether or not a current timing advance should be updated. Thus, according to some embodiments, the terminal device is operable to use at least one additional criterion to determine whether or not the timing advance value should be updated if the indication of distance between the terminal device and the other entity is within a predetermined range of values. According to some embodiments, the at least one additional criterion includes the result of a comparison between a timing advance validity threshold and an indication of a change in distance between the terminal device and a further entity distinct from the other entity. Accordingly, a terminal device which has determined a first timing advance validity threshold based on an indication of a distance between the terminal device and a first entity may be operable to determine a second timing advance validity threshold based on an indication of a distance between the terminal device and the first entity, and to further determine an indication of a second change in distance between the terminal device and a second entity which is distinct from the first entity. For instance, in some examples, the first entity is a serving network access node for a first cell with which the terminal device is associated, and the second entity is a network access node associated with a second, neighbouring cell. In accordance with some embodiments, the terminal device is configured to determine whether or not a current timing advance should be updated based on each of: a first comparison between the indication of a change in distance between the terminal device and the first network access node and the first timing advance validity threshold; and a second comparison between an indication of a second change in distance between the terminal device and a second network access node and the second timing advance validity threshold. According to this example, the terminal device then determines whether or not the current timing advance should be updated based on the results of the first and second comparisons. If the terminal device determines the indication of a distance between the terminal device and the first network access node exceeds the first timing advance validity threshold and the indication of a distance between the terminal device and the second network access node exceeds the second timing advance validity threshold, the terminal device determines the timing advance should be updated. What may be considered to be advantageous about this approach is that the use of a second criterion can in some instances improve the accuracy of the validation of the current timing advance value. For example, where an indication of a distance between a terminal device and a network access node is based on a measure of a signal strength of signalling received from the network access node, and the terminal device is close to the edge of the cell served by the network access node, the low signal strength of RSRP and/or the influence of signal distortion may lead to an inaccurate indication of distance, compared to the scenario near the centre of the cell. In such instances, use of a timing advance validity threshold based on the indication of a distance may not be considered to be sufficiently accurate on its own, and use of an additional criterion may be advantageous. In some instances, the use of an additional criterion based on a measure of reference signalling received from the network access node of a neighbouring cell may enhance the accuracy of the timing advance validation, particularly if the reference signalling from the neighbouring cell is less attenuated and/or less influenced by distortion than that associated with the serving cell.

An example of such an embodiment, in the previously-discussed context of a look-up table, can be described with reference to Table 3. The left-hand column of Table 3 comprises a set of predetermined ranges of indicated distance between a terminal device and another (first) entity, expressed here as a range of measured RSRP at the terminal device of reference signalling received from the first entity. The corresponding entry in the right-hand column for each range comprises one or more criteria to be used to determine whether or not the current timing advance should be updated if the indication of a distance between the terminal device and the first entity falls into associated range. Thus, for instance, in the fourth row of the left-hand column, the range of indicated distance is 90 dBm<RSRP −86 dBm and the corresponding criteria in the right-hand column are that a first timing advance validity threshold, expressed as a change in measured RSRP received from the first entity, is 4 dB, and a second timing advance validity threshold, expressed as a change in measured RSRP received from the second entity, is 3 dB. Thus, in a scenario where an indication of a distance between the terminal device and the first entity, expressed as a measured RSRP value, falls into the range −90 dBm<RSRP≤−86 dBm (e.g. RSRP=−88 dBm), the terminal device configured according to this example will determine the current timing advance should be updated if the change in measured RSRP received from the first entity exceeds 4 dB and the change in measured RSRP received from the second entity exceeds 3 dB. In this approach, the relationship between an indication of a distance between the terminal device and the other entity and the one or more criteria to use for determining whether or not the current timing advance should be updated may be expressed in the form of a look-up table. As in other examples described herein, such a look-up table (of which Table 3 is only one exemplary instance) may be defined by standard, determined by a terminal device, or transmitted to the terminal device in signalling from another entity. Such a look-up table may comprise one of a plurality of candidate look-up tables to be used for determining validity criteria for a current timing advance on the basis of an indication of a distance between the terminal device and another entity. In such instances, as described elsewhere herein, the terminal device may determine which look-up table to use on the basis of signalling sent by another entity.

According to some embodiments the at least one additional criterion to determine whether or not the current timing advance value should be updated includes a criterion based on the observed time difference of arrival (OTDOA) of signalling received by the terminal device from a plurality of entities in the wireless telecommunications network. OTDOA is a known positioning technique wherein a terminal device is configured to make measurements of reference signal time difference (RSTD) between reference signals from a 'reference' entity (e.g. a network access node) and one or more further entities (e.g. further network access nodes). These RSTD measurements can be used to determine a spatial position of the terminal device, for example, by transmitting the measurements to an entity such as a location server which uses them to calculate an indication of said position for transmission back to the terminal device. Thus, in some embodiments, an additional timing advance validity criterion comprises determining whether a change in position, determined on the basis of RSTD measurements, has exceeded a predetermined threshold value. However, the measured values of RSTD may also be used to establish the criterion, without requiring further information about the position of the terminal device to be determined. Thus, in some embodiments, an additional timing advance validity criterion comprises determining whether a change in RSTD, measured at a terminal device, has exceeded a predetermined threshold value. In other instances, multiple measurements of RSTD may be made by a terminal device, and the timing advance validity criterion comprises determining whether a value based on a function of a plurality of RSTD measurements has exceeded a predetermined threshold value. What may be considered significant about these approaches is that a change in position of a terminal device is inferred from a change in one or more RSTD measurements. Thus a criterion based on RSTD measurements can be used to provide an indication of whether or not a terminal device has moved relative to another entity such that a current timing advance value used to transmit data from the terminal device to the other entity needs to be updated.

According to some embodiments, a timing advance validity threshold to be used by the terminal device is transmitted to the terminal device by another entity as part of signalling associated with a PUR transmission made to the other entity. For instance, the other entity may be a base station, and following reception of a PUR transmission from the terminal device, the base station may be configured to transmit signalling to the terminal device, indicating, for example, the acknowledgement/negative-acknowledgement (ACK/NACK) status of the PUR transmission. Thus in some examples, the message used to indicate the ACK/NACK status of the PUR transmission may further comprise a timing advance validity threshold which is henceforth used by the terminal device to determine whether or not the current timing advance should be updated, in accordance with the approaches described further herein. In other words, in such a scheme the terminal device is operable to store a current value of timing advance validity threshold transmitted from another entity, and use it to determine the validity of its current timing advance value based on a comparison between an indication of a change in distance between the terminal device and the other entity and the timing advance validity threshold. The determination of the timing advance validity threshold by the other entity may be based, for example, on a measure of SRS (sounding reference signal) received power or PUSCH received power from the terminal device. For example, the other entity may be a network access node of a serving cell for the terminal device, and a measure of received power of signalling received from the terminal device may be used by the base station to determine how close the terminal device is to the cell edge. This determination may be made, for instance, on the basis of a path loss model. According to some embodiments this scheme, in which a timing advance validity threshold to be used is received from the other entity in signalling following a PUR transmission, is used instead of the schemes described elsewhere herein according to which the terminal device locally determines a timing advance validity threshold to use based on an indication of a distance between the terminal device and the other entity. According to some embodiments, this scheme may comprises one of a number of schemes able to be used by the terminal device for determining current timing advance validity, and the selection of the appropriate scheme is made based on receiving messaging, for instance a messaging comprising a system information block (SIB), from another network entity.

According to some embodiments, determining whether or not the current timing advance should be updated is in response to the terminal device determining it should transmit a message using pre-configured uplink resources. Thus according to some embodiments, if the terminal device determines it should send a PUR transmission, the terminal device determines it should establish the validity of a current timing advance, according to any of the approaches detailed further herein. However, if the terminal device has not determined it should send a PUR transmission, the terminal device determines it is not necessary to establish the validity of a current timing advance. The terminal device which determines it should send a PUR transmission may then send the transmission if it determines the current timing advance is valid, or if it determines the current timing advance is not valid, defer sending the PUR transmission until it has first received an updated timing advance.

Though the various embodiments of the present approach have generally been described in respect of a terminal device for use in a wireless telecommunication system, it will be appreciated that according to some embodiments, aspects of the approach may be carried out by different entities within the wireless telecommunications system. Thus according to some embodiments, a network access node (e.g. a base station) is operable to determine a current timing advance to be used by a terminal device for transmitting data to the network access node, determine an indication of a distance between the network access node and the terminal device, determine a timing advance validity threshold based on the indication of a distance between the network access node and the terminal device, determine an indication of a change in distance between the network access node and the terminal device, and determine whether or not the current timing advance should be updated based on a comparison between the indication of a change in distance between the network access node and the terminal device and the timing advance validity threshold. According to some embodiments, the network access node is further operable to transmit an updated timing advance to the terminal device if the network access node determines the current timing advance should be updated.

According to some embodiments, some of the aspects detailed herein are carried out by a terminal device and other aspects are carried out a further network entity, for example a network access node such as a base station. In one example of such an embodiment, a current timing advance for transmitting data to another entity in the wireless telecommunication system is determined by a network access node and transmitted to a terminal device via signalling. The network access node further determines an indication of a distance between the terminal device and the network access node and transmits it to the terminal device via signalling. The indication of distance may for example be determined on the basis of signalling (e.g. SRS signalling) received from the terminal device by the network access node. According to this example, the terminal device, having received the current timing advance and the indication of a distance from the network access node, determines a timing advance validity threshold based on the indication of a distance between the terminal device and the network access node, determines an indication of a change in distance between the terminal device and the network access node, and determines whether or not the current timing advance should be updated based on a comparison between the indication of a change in distance between the terminal device and the network access node and the timing advance validity threshold. It should be appreciated this configuration is exemplary, and in principle each of the different aspects of the disclosure may be carried out by either a terminal device, a network access node, or other entity in a wireless telecommunications system, with signalling between these entities used to communicate required information for the approach according to the disclosure to be carried out. For example, a terminal device in accordance with the disclosure may receive from a further entity any of a current timing advance, an indication of a distance between the terminal device and another entity, a timing advance validity threshold, an indication of a change in distance between the terminal device and another entity, or an indication a current timing advance should be updated, the determination of these parameters and/or indications having been made by the further entity.

Figure 6:
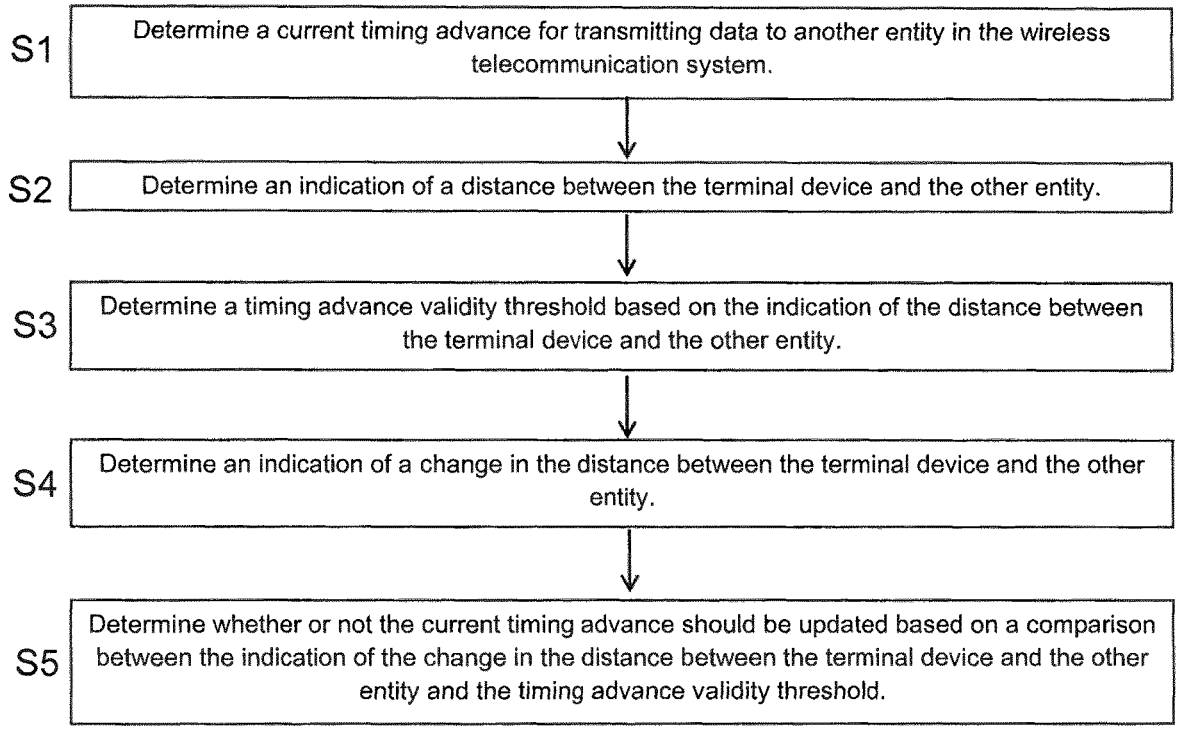
FIG. 6 is a flow diagram schematically representing some operating aspects of a terminal device in accordance with certain embodiments of the disclosure.

FIG. 6 is a flow diagram schematically representing some aspects of a method of operation for a terminal device in a wireless telecommunication system in accordance with certain embodiments of the disclosure.

In a first step, S1, the terminal device determines a current timing advance for transmitting data to another entity (e.g. a network access node) in the wireless telecommunication system.

In a second step, S2, the terminal device determines an indication of a distance between the terminal device and the other entity.

In a third step, S3, the terminal device determines a timing advance validity threshold based on the indication of the distance between the terminal device and the other entity.

In a fourth step, S4, the terminal device determines an indication of a change in the distance between the terminal device and the other entity.

In a fifth step, S5, the terminal device determines whether or not the current timing advance should be updated based on a comparison between the indication of the change in the distance between the terminal device and the other entity and the timing advance validity threshold.

Figure 7:
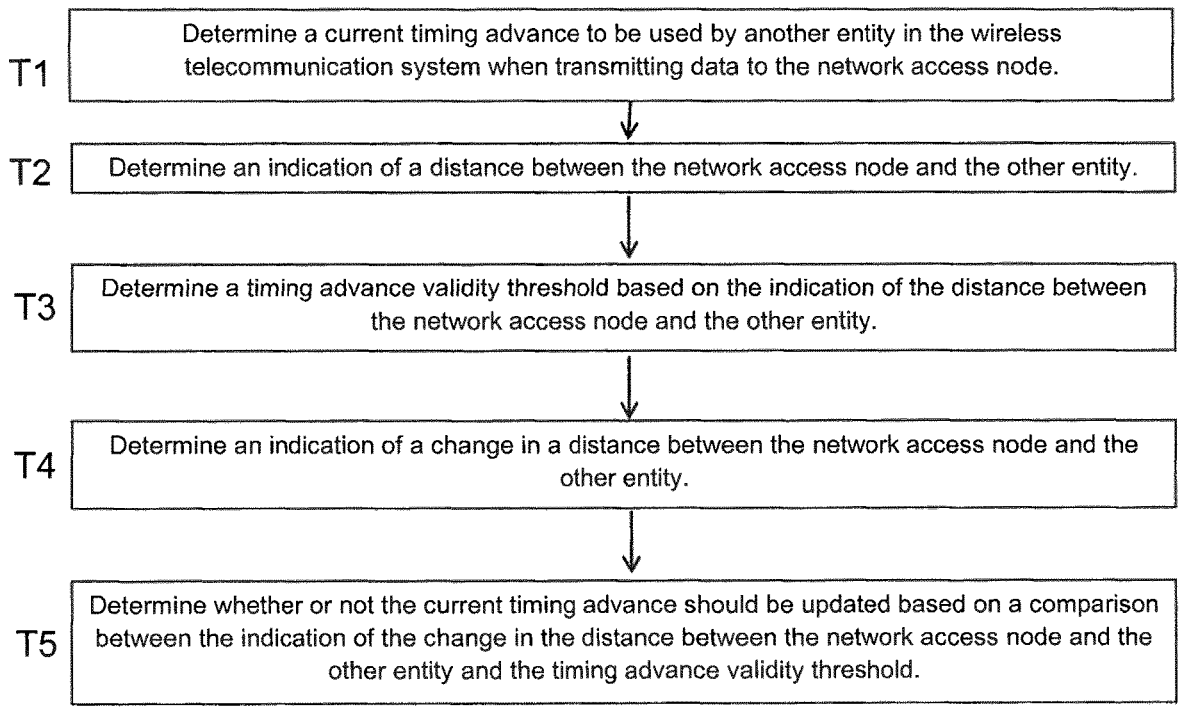
FIG. 7 is a flow diagram schematically representing some operating aspects of a network access node in accordance with certain embodiments of the disclosure.

FIG. 7 is a flow diagram schematically representing some aspects of a method of operation for a network access node in a wireless telecommunication system in accordance with certain embodiments of the disclosure.

In a first step, T1, the network access node determines a current timing advance to be used by another entity (e.g. a terminal device) in the wireless telecommunication system when transmitting data to the network access node.

In a second step, T2, the network access node determines an indication of a distance between the network access node and the other entity.

In a third step, T3, the network access node determines a timing advance validity threshold based on the indication of the distance between the network access node and the other entity.

In a fourth step, T4, the network access node determines an indication of a change in a distance between the network access node and the other entity.

In a fifth step, T5, the network access node determines whether or not the current timing advance should be updated based on a comparison between the indication of the change in the distance between the network access node and the other entity and the timing advance validity threshold.

Thus there has been described a terminal device for use in a wireless telecommunication system, wherein the terminal device comprises controller circuitry and transceiver circuitry configured to operate together such that the terminal device is operable to: determine a current timing advance for transmitting data to another entity in the wireless telecommunication system; determine an indication of a distance between the terminal device and the other entity;

determine a timing advance validity threshold based on the indication of the distance between the terminal device and the other entity; determine an indication of a change in the distance between the terminal device and the other entity; and determine whether or not the current timing advance should be updated based on a comparison between the indication of the change in the distance between the terminal device and the other entity and the timing advance validity threshold.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by multiple entities operating in the wireless telecommunications system, for example a radio network infrastructure equipment and a terminal device. It will be appreciated such predetermined/ predefined information may in general be established, for example, by definition in an operating standard for the wireless telecommunication system, or in previously exchanged signalling between the relevant entities, for example in system information signalling, or in association with radio resource control setup signalling. That is to say, the specific manner in which the relevant predefined information is established and shared between the various elements of the wireless telecommunications system is not of primary significance to the principles of operation described herein.

It may further be noted various example approaches discussed herein rely on information which is exchanged/ communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Respective features of the present disclosure are defined by the following numbered paragraphs:

Paragraph 1. A terminal device for use in a wireless telecommunication system, wherein the terminal device comprises controller circuitry and transceiver circuitry configured to operate together such that the terminal device is operable to: determine a current timing advance for transmitting data to another entity in the wireless telecommunication system; determine an indication of a distance between the terminal device and the other entity; determine a timing advance validity threshold based on the indication of the distance between the terminal device and the other entity; determine an indication of a change in the distance between the terminal device and the other entity; and determine whether or not the current timing advance should be updated based on a comparison between the indication of the change in the distance between the terminal device and the other entity and the timing advance validity threshold.

Paragraph 2. The terminal device of paragraph 1, wherein the indication of the distance between the terminal device and the other entity is based on a measure of a signal strength of signalling received from the other entity.

Paragraph 3. The terminal device of paragraphs 1 or 2, wherein the indication of the change in distance between the terminal device and the other entity is based on a measure of a change in a signal strength of signalling received from the other entity.

Paragraph 4. The terminal device of any of paragraphs 1 to 3, wherein the terminal device is further operable to determine the current timing advance should not be updated if the indication of the distance between the terminal device and the other entity is within a predetermined range.

Paragraph 5. The terminal device of any of paragraphs 1 to 4, wherein the terminal device is operable to determine the indication of the distance between the terminal device and the other entity using different position sensing technologies for different distances between the terminal device and the other entity.

Paragraph 6 The terminal device of any of paragraphs 1 to 5, wherein the terminal device is operable to determine an indication of a position for the other entity and to determine an indication of a position for the terminal device and to use these to determine the indication of the distance between the terminal device and the other entity.

Paragraph 7. The terminal device of any of paragraphs 1 to 6, wherein the indication of the distance between the terminal device and the other entity comprises the current timing advance.

Paragraph 8. The terminal device of any of paragraphs 1 to 7, wherein the timing advance validity threshold is determined from the indication of the distance between the terminal device and the other entity by taking account of a radio path loss model.

Paragraph 9. The terminal device of paragraph 8 wherein the radio path loss model is a free space radio path loss model or a Hata radio path loss model.

Paragraph 10. The terminal device of any of paragraphs 1 to 9, wherein the timing advance validity threshold comprises an indication of a change in a signal strength of signalling received from the other entity.

Paragraph 11. The terminal device of any of paragraphs 1 to 10, wherein determining the timing advance validity threshold based on the indication of the distance between the terminal device and the other entity comprises comparing the indication of the distance between the terminal device and the other entity with a plurality of ranges of values for the indication of the distance between the terminal device and the other entity, and selecting the timing advance validity threshold value according to which of the plurality of ranges of values for the indication of the distance between the terminal device and the other entity contains the determined indication of the distance between the terminal device and the other entity.

Paragraph 12. The terminal device of paragraph 11, wherein the terminal device is further operable to receive from the other entity an indication of a relationship between the plurality of ranges of values for the indication of the distance between the terminal device and the other entity and the corresponding timing advance validity threshold values.

Paragraph 13. The terminal device of any of paragraphs 1 to 12, wherein the terminal device is further operable to use at least one further criterion to determine whether or not the timing advance value should be updated if the indication of distance between the terminal device and the other entity is within a predetermined range.

Paragraph 14. The terminal device of paragraph 13, wherein the at least one additional criterion comprises the outcome of a comparison between a timing advance validity threshold and an indication of a change in a distance between the terminal device and a further entity in the wireless telecommunication system.

Paragraph 15. The terminal device of any of paragraphs 1 to 13, wherein the terminal device is operable to determine two timing advance validity thresholds based on the indication of the distance between the terminal device and the other entity, and to select one of the two timing advance validity thresholds to use for the comparison between the indication of the change in the distance between the terminal device and the other entity and the timing advance validity threshold based on whether the indication of a change in the distance between the terminal device and the other entity indicates the terminal device has moved towards or away from the other entity.

Paragraph 16. A method of operating a terminal device in a wireless telecommunication system, the method comprising; determining a current timing advance for transmitting data to another entity in the wireless telecommunication system; determining an indication of a distance between the terminal device and the other entity; determining a timing advance validity threshold based on the indication of the distance between the terminal device and the other entity; determining an indication of a change in a distance between the terminal device and the other entity; and determining whether or not the current timing advance should be updated based on a comparison between the indication of the change in the distance between the terminal device and the other entity and the timing advance validity threshold.

Paragraph 17. Circuitry for a terminal device for use in a wireless telecommunication system, wherein the circuitry comprises controller circuitry and transceiver circuitry configured to operate together such that the circuitry is operable to cause the terminal device to: determine a current timing advance for transmitting data to another entity in the wireless telecommunication system; determine an indication of a distance between the terminal device and the other entity; determine a timing advance validity threshold based on the indication of a distance between the terminal device and the other entity; determine an indication of the change in a distance between the terminal device and the other entity; and determine whether or not the current timing advance should be updated based on a comparison between the indication of the change in the distance between the terminal device and the other entity and the timing advance validity threshold.

Paragraph 18. A network access node for use in a wireless telecommunication system, wherein the network access node comprises controller circuitry and transceiver circuitry configured to operate together such that the network access node is operable to; determine a current timing advance to be used by another entity in the wireless telecommunication system when transmitting data to the network access node; determine an indication of a distance between the network access node and the other entity; determine a timing advance validity threshold based on the indication of the distance between the network access node and the other entity; determine an indication of a change in a distance between the network access node and the other entity; and determine whether or not the current timing advance should be updated based on a comparison between the indication of the change in the distance between the network access node and the other entity and the timing advance validity threshold.

Paragraph 19. The network access node of paragraph 18, wherein the network access node is further operable to transmit an updated timing advance to the other entity if the network access node determines the current timing advance should be updated.

Paragraph 20. A method of operating a network access node in a wireless telecommunication system, the method comprising; determining a current timing advance to be used by another entity in the wireless telecommunication system when transmitting data to the network access node; determining an indication of a distance between the network access node and the other entity; determining a timing advance validity threshold based on the indication of the distance between the network access node and the other entity; determining an indication of a change in a distance between the network access node and the other entity; and determining whether or not the current timing advance should be updated based on a comparison between the indication of the change in the distance between the network access node and the other entity and the timing advance validity threshold.

Paragraph 21. Circuitry for a network access node for use in a wireless telecommunication system, wherein the circuitry comprises controller circuitry and transceiver circuitry configured to operate together such that the circuitry is operable to cause the network access node to: determine a current timing advance to be used by another entity in the wireless telecommunication system when transmitting data to the network access node; determine an indication of a distance between the network access node and the other entity; determine a timing advance validity threshold based on the indication of the distance between the network access node and the other entity; determine an indication of a change in a distance between the network access node and the other entity; and determine whether or not the current timing advance should be updated based on a comparison between the indication of the change in the distance between the network access node and the other entity and the timing advance validity threshold.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "LTE for UMTS OFDMA and SC-FDMA based radio access", John Wiley and Sons, 2009

What is claimed is:

1. A terminal device for use in a wireless telecommunication system, the terminal device comprising controller circuitry and transceiver circuitry configured to operate together such that the terminal device is configured to:
   determine a current timing advance for transmitting data to another entity in the wireless telecommunication system;
   determine an indication of a distance between the terminal device and the other entity;
   determine a timing advance validity threshold based on the indication of the distance between the terminal device and the other entity;
   determine an indication of a change in the distance between the terminal device and the other entity; and
   determine whether or not the current timing advance should be updated based on a comparison between the indication of the change in the distance between the terminal device and the other entity and the timing advance validity threshold.

2. The terminal device of claim 1, wherein the indication of the distance between the terminal device and the other entity is based on a measure of a signal strength of signalling received from the other entity.

3. The terminal device of claim 1, wherein the indication of the change in distance between the terminal device and the other entity is based on a measure of a change in a signal strength of signalling received from the other entity.

4. The terminal device of claim 1, wherein the terminal device is further configured to determine the current timing advance should not be updated if the indication of the distance between the terminal device and the other entity is within a predetermined range.

5. The terminal device of claim 1, wherein the terminal device is further configured to determine the indication of the distance between the terminal device and the other entity using different position sensing technologies for different distances between the terminal device and the other entity.

6. The terminal device of claim 1, wherein the terminal device is further configured to determine an indication of a position for the other entity and to determine an indication of a position for the terminal device and to use these to determine the indication of the distance between the terminal device and the other entity.

7. The terminal device of claim 1, wherein the indication of the distance between the terminal device and the other entity comprises the current timing advance.

8. The terminal device of claim 1, wherein the timing advance validity threshold is determined from the indication of the distance between the terminal device and the other entity by taking account of a radio path loss model.

9. The terminal device of claim 8 wherein the radio path loss model is a free space radio path loss model or a Hata radio path loss model.

10. The terminal device of claim 1, wherein the timing advance validity threshold comprises an indication of a change in a signal strength of signalling received from the other entity.

11. The terminal device of claim 1, wherein to determine the timing advance validity threshold based on the indication of the distance between the terminal device and the other entity. the terminal device is further configured to compare the indication of the distance between the terminal device and the other entity with a plurality of ranges of values for the indication of the distance between the terminal device and the other entity, and select the timing advance validity threshold value according to which of the plurality of ranges of values for the indication of the distance between the terminal device and the other entity contains the determined indication of the distance between the terminal device and the other entity.

12. The terminal device of claim 11, wherein the terminal device is further configured to receive from the other entity an indication of a relationship between the plurality of ranges of values for the indication of the distance between the terminal device and the other entity and the corresponding timing advance validity threshold values.

13. The terminal device of claim 1, wherein the terminal device is further configured to use at least one further criterion to determine whether or not the timing advance value should be updated if the indication of distance between the terminal device and the other entity is within a predetermined range.

14. The terminal device of claim 13, wherein the at least one additional criterion comprises the outcome of a comparison between a timing advance validity threshold and an indication of a change in a distance between the terminal device and a further entity in the wireless telecommimication system.

15. The terminal device of claim 1, wherein the terminal device is further configured to determine two timing advance validity thresholds based on the indication of the distance between the terminal device and the other entity, and to select one of the two timing advance validity thresholds to use for the comparison between the indication of the change in the distance between the terminal device and the other entity and the timing advance validity threshold based on whether the indication of a change in the distance between the terminal device and the other entity indicates the terminal device has moved towards or away from the other entity.

16. A method of operating a terminal device in a wireless telecommunication system, the method comprising:
 determining a current timing advance for transmitting data to another entity in the wireless telecommunication system;
 determining an indication of a distance between the terminal device and the other entity;
 determining a timing advance validity threshold based on the indication of the distance between the terminal device and the other entity;
 determining an indication of a change in a distance between the terminal device and the other entity; and
 determining whether or not the current timing advance should be updated based on a comparison between the indication of the change in the distance between the terminal device and the other entity and the timing advance validity threshold.

17. A method of operating a network access node in a wireless telecommunication system, the method comprising:
 determining a current timing advance to be used by another entity in the wireless telecommunication system when transmitting data to the network access node;
 determining an indication of a distance between the network access node and the other entity;
 determining a timing advance validity threshold based on the indication of the distance between the network access node and the other entity;
 determining an indication of a change in a distance between the network access node and the other entity; and
 determining whether or not the current timing advance should be updated based on a comparison between the indication of the change in the distance between the network access node and the other entity and the timing advance validity threshold.

18. A non-transitory computer-readable medium encoded with computer-readable instructions that, when executed by circuitry of a terminal device, cause the circuitry of the terminal device to perfoiiu a method according to claim 16.

19. A non-transitory computer-readable medium encoded with computer-readable instructions that, when executed by circuitry of a terminal device, cause the circuitry of the terminal device to perform a method according to claim 17.

* * * * *